United States Patent
Mai et al.

[11] Patent Number: 6,005,711
[45] Date of Patent: Dec. 21, 1999

[54] VARIABLE OPTICAL POWER TELESCOPIC SIGHT WITH SIDE FOCUS CONTROL

[75] Inventors: Neil T. Mai, Beaverton; Mark A. Thomas, Hillsboro, both of Oreg.

[73] Assignee: Leupold & Stevens, Inc., Beaverton, Oreg.

[21] Appl. No.: 09/010,305

[22] Filed: Jan. 21, 1998

[51] Int. Cl.$^6$ .................................................. G02B 23/00
[52] U.S. Cl. ........................ 359/424; 359/399; 359/425
[58] Field of Search .................................. 359/399–402, 359/410, 422, 424–428, 432, 693, 694, 705; 33/233, 245–248, 297–298; 42/101, 103

[56] References Cited

U.S. PATENT DOCUMENTS

| | | | |
|---|---|---|---|
| 2,051,050 | 8/1936 | Langsner | 359/426 |
| 2,138,067 | 11/1938 | Mossberg | 359/424 |
| 2,150,629 | 3/1939 | Mossberg | 33/246 |
| 2,171,360 | 8/1939 | Strang | 359/425 |
| 2,398,276 | 4/1946 | Altman | 359/422 |
| 2,997,916 | 8/1961 | Friedman et al. | 359/424 |
| 3,058,391 | 10/1962 | Leupold | 359/422 |
| 3,161,716 | 12/1964 | Burris et al. | 359/428 |
| 3,612,646 | 10/1971 | Walker et al. | 359/424 |
| 3,782,822 | 1/1974 | Spence | 359/428 |
| 3,918,791 | 11/1975 | Perry | 359/422 |
| 4,408,842 | 10/1983 | Gibson | 359/422 |
| 4,643,542 | 2/1987 | Gibson | 359/424 |

*Primary Examiner*—Thong Nguyen
*Attorney, Agent, or Firm*—Stoel Rives LLP

[57] ABSTRACT

A variable optical power telescopic sight with adjustable focus control includes a tubular housing having a longitudinal axis, an interior and exterior, and first and second ends. The housing holds an eyepiece positioned at the second end and an erector positioned in the interior of the housing medially of the first end and the eyepiece. To enable side focus control in the telescopic sight, an objective lens system includes a stationary portion positioned in the interior of the housing near the first end and a movable portion positioned in the interior of the housing between the stationary portion and the erector for movement generally along the longitudinal axis to adjust the focus of the telescopic sight. A manually adjustable focus control device projects outwardly from the exterior of the housing in a direction transverse to the longitudinal axis and is connected to the movable portion of the objective lens system. The side mounted focus control device allows a marksman to change the position of the movable portion of the objective lens along the longitudinal axis to adjust the focus of the telescopic sight. A slidable lens carrier, positioned within the housing and coupled to the focus control device, holds the movable portion of the objective lens system for movement along the longitudinal axis of the housing. In an alternative embodiment, the movable portion of the objective lens system is operably connected to a pivotable erector lens system for increasing a windage and holdover adjustment of the telescopic sight.

12 Claims, 8 Drawing Sheets

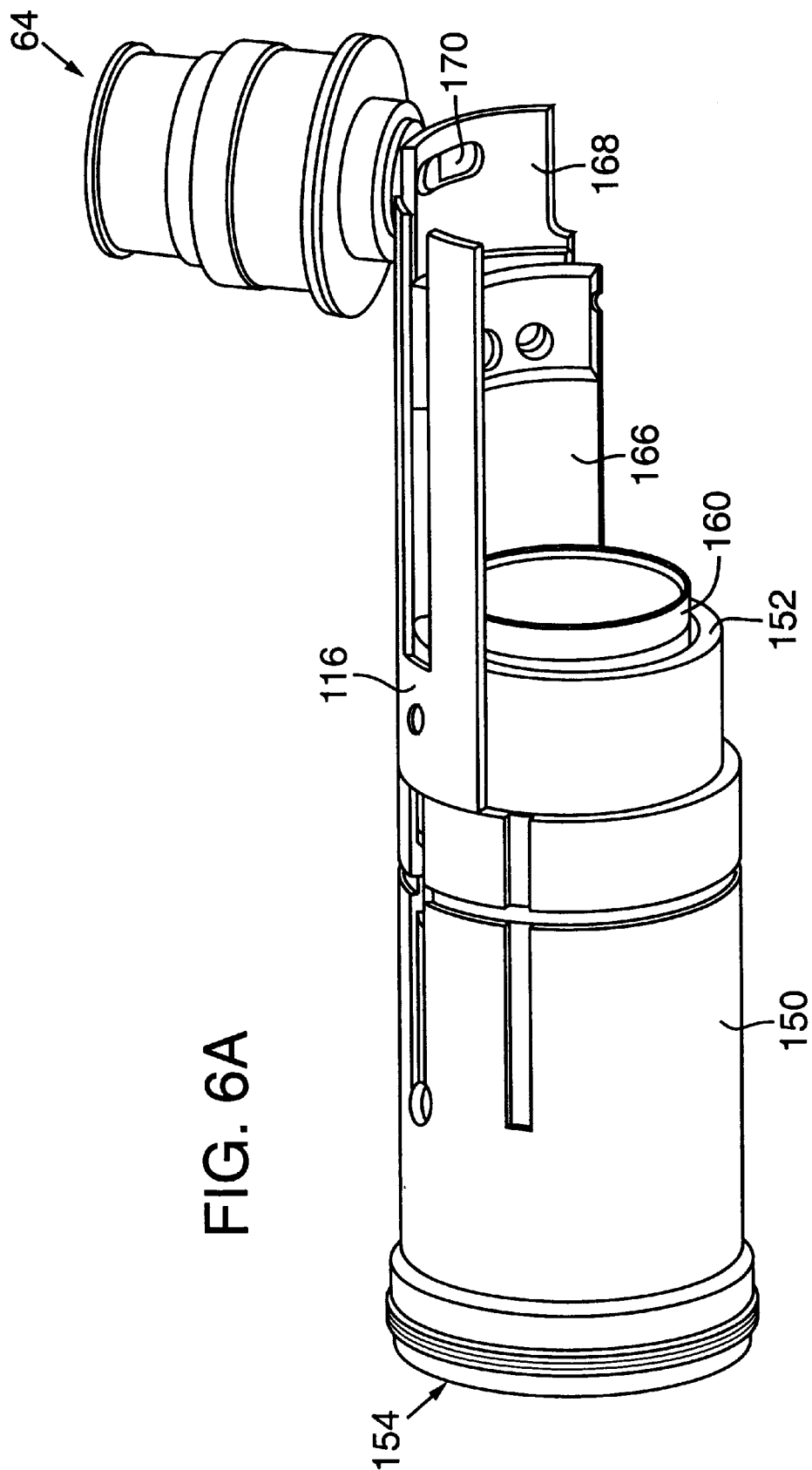

VARIABLE OPTICAL POWER TELESCOPIC SIGHT WITH SIDE FOCUS CONTROL

TECHNICAL FIELD

The present invention relates generally to telescopic sights having adjustable optical magnification or power and, in particular, to a variable optical power telescopic rifle sight with an adjustable side mounted focus control for viewing objects at different distances from the marksman.

BACKGROUND OF THE INVENTION

Telescopic sights for rifles typically include eyepiece and objective lenses positioned at opposite ends of a tubular housing. Conventional variable optical power telescopic sights also include an erector lens positioned medially of the eyepiece and objective lenses and movable along a central longitudinal axis of the housing for adjustment of the optical power.

In these sights, an image focus adjustment compensating for variations in the distance from the marksman to the target is typically accomplished by longitudinal movement of either the eyepiece or objective lens. One prevalent image focus adjustment implementation uses a threaded mounting ring that is coupled to the housing for rotation about the eyepiece end or objective end of the housing. The marksman rotates the mounting ring to adjust the position of a focusing element of the eyepiece or the objective lens along the longitudinal axis of the housing.

This implementation is prone to image distortion caused by tilting of the objective or eyepiece lens during focus adjustment and makes it difficult to seal the ends of the housing to maintain within the telescopic sight a nitrogen gas charge necessary to prevent fogging and condensation on internal lens surfaces. This implementation also requires the marksman to stop viewing the target through the telescopic sight, move the rifle out of shooting position, and rotate the rifle to read markings on the outside of the housing or focusing ring which indicate the amount of focus adjustment. After viewing the focus ring adjustment indicator markings, the marksman then must reacquire the target.

A technique for varying the optical power of a telescopic sight is described in U.S. Pat. No. 3,058,391 of Leupold. This telescopic sight has an erector lens positioned between an objective lens and an eyepiece lens and adjustable along the longitudinal axis of the housing. It includes a field lens or collector lens located between the objective and the erector and movable in conjunction with and relative to movement of the power varying erector to compensate for focus effects resulting from movement of the erector. Movement of the collector and erector lenses to maintain focus during adjustment of the optical power of the telescopic sight is accomplished by turning a single adjustment ring connected to a cam sleeve mechanism within the interior of the sight housing.

U.S. Pat. No. 4,643,542 of Gibson describes a fixed optical power telescopic sight with a focus adjustment that is accomplished by longitudinal movement of an erector lens. In this telescopic sight, a focus knob mounted laterally on the outer side of the sight housing controls the erector movement. This telescopic sight has objective and eyepiece lenses that are fixedly mounted within the housing to form an air tight seal and maintain nitrogen gas charge within the housing. This design does not, however, provide adjustment of the optical power of the telescopic sight.

Because bullet trajectory, wind conditions, and distance to the target can vary depending upon shooting conditions, quality rifle scopes typically provide compensation for variations in these parameters by allowing the marksman to make small adjustments to the optical characteristics or the aiming of the sight relative to the rifle on which it is mounted. These adjustments are known as windage and holdover and are typically accomplished by lateral movement of the reticle within the telescopic sight, as shown in U.S. Pat. No. 3,058,391 of Leupold, or pivotal movement of lenses mounted to a pivot tube within the housing to divert the optical path of the observed light before it reaches the reticle, as shown in U.S. Pat. Nos. 3,297,389 and 4,408,842 of Gibson. In these designs, a marksman accomplishes adjustment of windage and holdover by turning a laterally protruding knob or screw that is operatively connected to the reticle or pivot tube. The range of adjustment for windage and holdover in these designs is limited by the space available within the housing for lateral movement of the reticle or pivotal movement of the pivot tube.

SUMMARY OF THE INVENTION

An object of the invention is, therefore, to provide a variable optical power telescopic sight having a side mounted focus control knob that allows an observer to adjust the focus of the sight and view a readout of the focus adjustment from the observing position without interrupting observation of the target through the sight.

Another object of the invention is to provide such a telescopic sight with a fixed objective lens element that forms a high-integrity air tight seal to maintain a nitrogen charge within the telescopic sight and eliminate a potential for image distortion and aiming inaccuracies resulting from lens element tilt during adjustment.

A further object of the invention is to provide such a telescopic sight having a manually adjustable cam mechanism that moves an erector lens system in conjunction with a collector lens to maintain image focus during adjustment of the optical power of the sight.

Yet another object of the invention is to provide a rifle-mounted telescopic sight that is of simple and rugged construction and is capable of withstanding without degradation of accuracy or precision the handling and environmental conditions to which hunting and military rifles are exposed.

Still another object of the invention is to provide such a rifle-mounted telescopic sight having an increased range of adjustment for holdover and windage.

The present invention is a telescopic sight that includes an elongate tubular housing that holds at opposite ends an objective lens system and an eyepiece lens, a manually adjustable movable erector lens for varying optical power, and a side mounted focus control device located medially along and protruding laterally from the outside of the housing for focusing the sight. The erector lens is located medially of the objective lens system and the eyepiece and pivotally mounted to a pivot tube within the housing to provide windage and holdover adjustments. A collector lens is located medially of the objective lens system and the erector and pivotally mounted to the pivot tube for movement in conjunction with the erector to maintain focus during movement of the power varying erector.

The optical power and focal length of the telescopic sight are determined by the objective lens system in combination with other lens elements present in the telescopic sight. In a first embodiment, the objective lens system includes a positive lens, the parameters of which result in a positive Petzval sum calculation. In a second embodiment, the objective lens system includes a negative Barlow lens. The use of a positive lens results in a shorter effective focal length, while the use of a Barlow lens results in a longer effective focal length without requiring changes in the physical dimensions of the housing. Physical dimensions of the telescopic sight are important to maintain so that it can be mounted to a rifle with the use of mounting brackets and hardware of a standard size and spacing.

The objective lens system is split to facilitate side mounted focus control and includes a fixed objective lens portion positioned at an end of the housing and a movable objective lens portion positioned inside the housing medially of the fixed objective lens portion and the erector. The fixed objective lens portion is fixedly mounted within the interior of the housing at one end to form an air tight seal for maintaining a nitrogen gas charge within the telescopic sight to inhibit fogging and condensation on internal lens surfaces. The movable objective lens portion is located in proximity and is linked to an adjustable side mounted focus control knob that a marksman turns to move the movable lens portion along a central longitudinal axis of the housing and thereby adjust the focus of the telescopic sight.

The focus control knob includes an offset drive pin projecting within the interior of the housing for and arranged so that rotation of the focus control knob results in orbital movement of the offset drive pin in a plane perpendicular to the axis of rotation of the focus control knob. The offset drive pin is engaged in an elongated slot formed in a link arm that is connected to the movable objective lens portion. The slot is oriented transversely of the longitudinal axis, and the coupling between the offset drive pin and the link arm is such that orbital movement of the offset drive pin imparts movement along the longitudinal axis to the link arm and the connected movable objective lens portion.

The side mounted focus knob includes a dial turret with exterior markings that indicate the amount of focus adjustment. This feature enables the marksman to use one eye to view the target through the telescopic sight and the other eye to read the dial turret focus indication markings without moving the rifle from the shooting position.

In another embodiment of the invention, the movable objective portion is connected to the pivot tube so that the windage and holdover adjustments pivot the movable objective portion together with the erector and collector lenses. The pivot tube includes a pivot end and a distal end. The movable objective portion of the objective is positioned near the distal end while the erector is positioned within the pivot tube between the movable objective portion and the pivot end. When the movable objective portion mounted in the pivot tube is a Barlow lens, the windage and holdover adjustments are amplified with respect to the position of the image projected at the plane of the reticle, resulting in an increased effective range of the holdover and windage adjustments.

Additional objects and advantages of this invention will be apparent from the following detailed description of preferred embodiments thereof which proceeds with reference to the accompanying drawings.

BRIEF DESCRIPTION OF THE DRAWINGS

FIG. 6A is a cut-away perspective view of the telescopic sight of FIG. 2 showing the coupling between the focus control device and the movable objective portion;

DETAILED DESCRIPTION OF PREFERRED EMBODIMENTS

Figure 1:
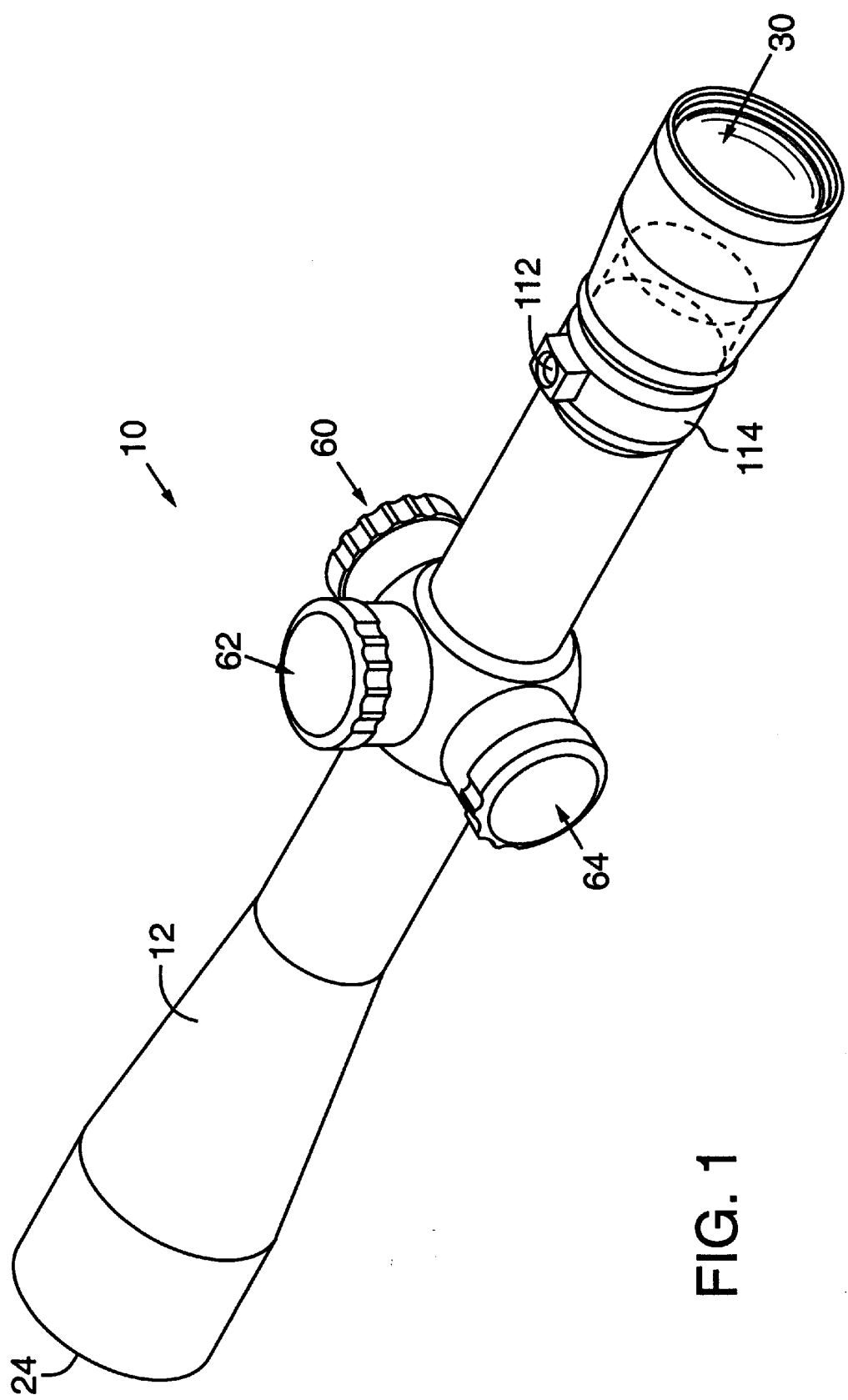
FIG. 1 is a perspective view of a telescopic sight in accordance with the present invention.
Figure 2:
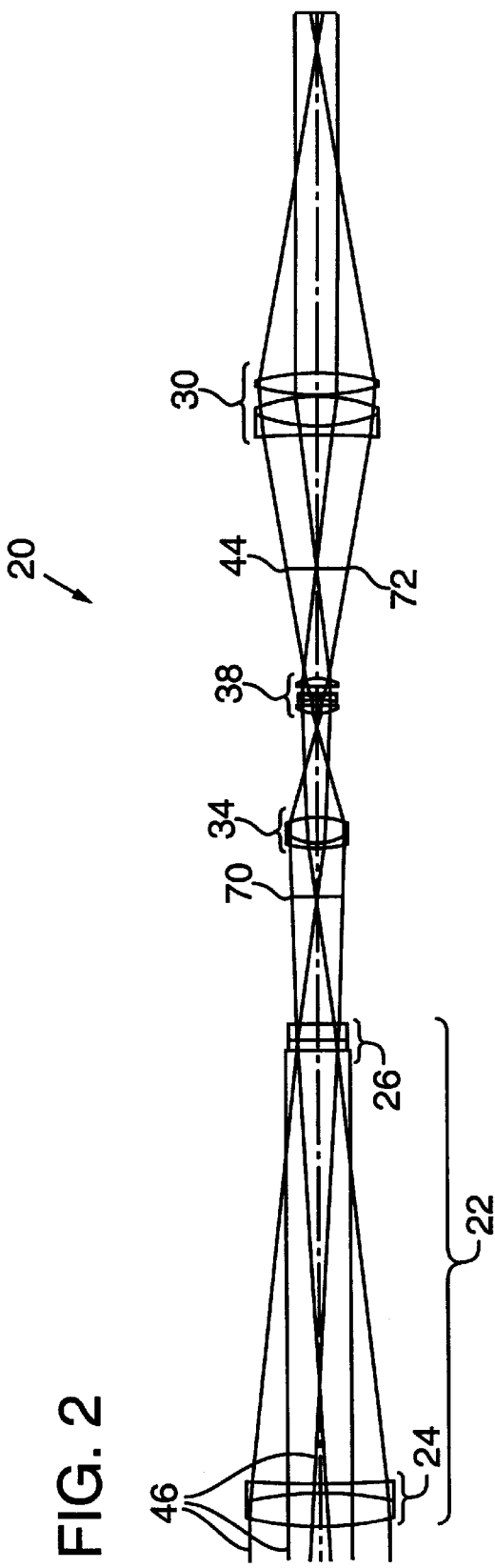
FIG. 2 is a ray-trace diagram of the optical system provided in the telescopic sight of FIG. 1.
Figure 3:
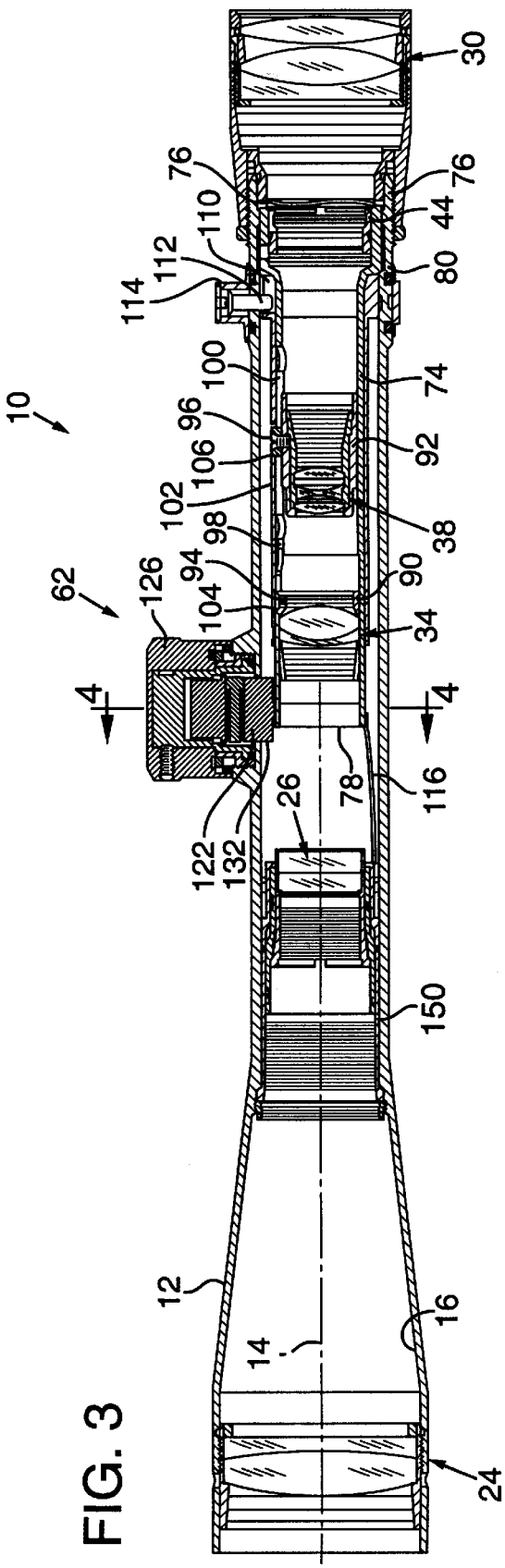
FIG. 3 is a sectional view of the telescopic sight of FIG. 1.

FIG. 1 shows a pictorial view of a telescopic sight 10, which represents a first preferred embodiment of the present invention. FIG. 2 is a ray trace diagram of an optical system 20 implemented in telescopic sight 10. FIG. 3 shows a cross section of telescopic sight 10 revealing the mounting arrangement of optical system 20 within a housing 12 of telescopic sight 10. With reference to FIGS. 1–3, telescopic sight 10 includes an elongate tubular housing 12 having a central longitudinal axis 14 and an inner surface 16, and holding within its interior an optical system 20. Optical system 20 includes at one end an objective lens system 22 having a fixed objective portion 24 and a movable objective portion 26 and at the other end an eyepiece 30. A collector 34, an erector 38, and a reticle 44 are positioned between objective lens system 22 and eyepiece 30. Light rays 46 reflected by or emitted from an observed distant object (not shown) enter telescopic sight 10 through fixed objective portion 24, pass through each element of optical system 20, and exit sight 10 through eyepiece 30 for viewing by a marksman (not shown). A windage control device 60, a holdover control device 62, and a focus control device 64 are all rotatably mounted to the housing 12 for adjustment of the lenses within telescopic sight 10 as further described below. Housing 12 and most other nonoptical components of telescopic sight 10 may be formed of aluminum alloy or other high strength, lightweight material. The lenses and other elements of optical system 20 may be formed of optical quality glass, plastic, or another suitable material.

With particular reference to FIG. 2, one possible design uses a positive cemented doublet for fixed objective portion 24, a positive cemented doublet characterized by a positive Petzval sum calculation for movable objective portion 26, a cemented doublet for collector 34, an air-spaced triplet for erector 38, and a cemented doublet paired with a separate double convex lens for eyepiece 30. The lens designs and the number of lens elements within each of the described functional units will vary depending upon the range of magnification desired and the overall sight design.

In operation, telescopic sight 10 is used by a marksman to view distant objects and aim a rifle at the objects. Light rays 46 propagating from an observed object (not shown) located at a great distance from telescopic sight 10 follow nearly parallel paths upon reaching sight 10. Light rays 46 are refracted by fixed objective portion 24 and movable objective portion 26 before converging at a first focal plane 70 located medially of movable objective portion 26 and collector 34. Collector 34 refracts light rays 46 to correct image defects and distortion before light rays 46 pass through erector 38. Erector 38 provides optical magnification of the image and flips or "erects" the inverted image of first focal plane 70. Light rays 46 exiting erector 38 converge at a second focal plane 72. Second focal plane 72 is located at the plane of reticle 44 when the focus of sight 10 is correctly adjusted, but a change in the distance of the observed object from sight 10 displaces longitudinally the image formed at first focal plane 70 such that the image formed at second focal plane 72 is also displaced longitudinally. Such longitudinal displacement results in parallax. Adjustment of the longitudinal position of movable objective portion 26 maintains the location of focal planes 70 and 72 to overcome parallax.

With particular reference to FIG. 3, a pivot tube 74, having a pivot end 76 and a distal end 78, is mounted in a pivot socket 80 formed on the inner surface 16 of housing 12 for pivotal movement of pivot tube 74 within housing 12. A collector slide 90 is slidably positioned within pivot tube 74 near distal end 78 and includes a collector follower pin 94, slidably engaged in a collector guide slot 98 formed or machined along the length of pivot tube 74. In similar fashion, an erector slide 92 is slidably positioned within pivot tube 74 medially of collector slide 90 and pivot end 76, and includes an erector follower pin 96 slidably engaged in an erector guide slot 100. A cam sleeve 102 surrounds pivot tube 74 and engages follower pins 94 and 96 within helical cam slots 104 and 106 formed or machined in cam sleeve 102. A drive slot 110 in cam sleeve 102 receives a drive pin 112 mounted on a power adjustment ring 114 and protruding through a housing slot (not shown) which partly circumscribes housing 12. Rotation of power adjustment ring 114 circumferentially about housing 12 moves drive pin 112 within the housing slot to rotate cam sleeve 102 about longitudinal axis 14, which in turn drives follower pins 94 and 96 to impart longitudinal movement to collector slide 90 and erector slide 92, and thus to collector 34 and erector 38. It will be appreciated that pivotal displacement of pivot tube 74 causes longitudinal movement of components connected to pivot tube 74 to become generally longitudinal with a small component of lateral movement. The operation and configuration of the power varying mechanism and pivot tube are described in further detail in U.S. Patent Nos. 3,058,391 and 4,408,842.

Longitudinal movement of erector 38 has the effect of changing the optical magnification of telescopic sight 10, while longitudinal movement of collector 34 compensates for undesirable optical effects such as parallax and distortion caused by the movement of erector 38. These adjustments maintain focus and clarity of the image throughout the range of adjustment of optical power. Skilled persons will appreciate that the appropriate pitch for helical cam slots 104 and 106 depends upon the optical design of collector 34, erector 38, and the remainder of telescopic sight 10.

Figure 4:
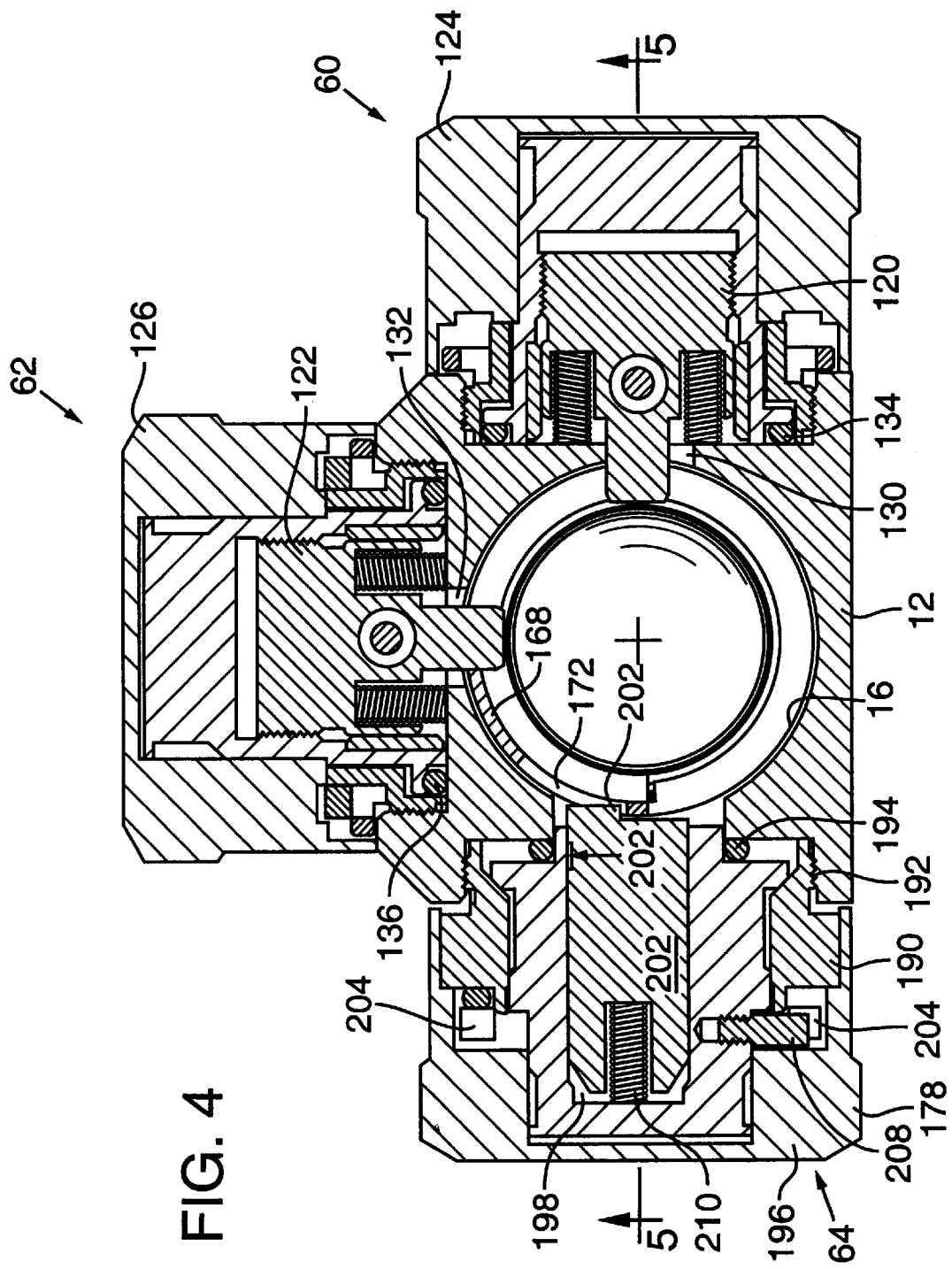
FIG. 4 is an enlarged sectional view of the telescopic sight taken along line 4—4 of FIG. 3.

FIG. 4 is a cross section of telescopic sight 10 taken along line 4—4 of FIG. 3 showing windage, holdover, and focus control devices 60, 62, and 64 in detail. As shown in FIGS. 3 and 4, a pivot tube leaf spring 116 (FIG. 3) secured at one end to inner surface 16 of housing 12 biases distal end 78 of pivot tube 74 against threaded cores 120 and 122 of windage and holdover control devices 60 and 62. Pivot tube leaf spring 116 may be a double leaf spring (FIG. 6B) or one or more individual springs that optimize the magnitude and direction of spring force to inhibit unwanted movement of pivot tube 74 during rifle recoil. Windage and holdover control devices 60 and 62 are mounted to housing 12 such that rotational movement of windage and holdover knobs 124 and 126 advances and retracts threaded cores 120 and 122 protruding through openings 130 and 132 in housing 12 to impart pivotal movement to pivot tube 74, and thus to collector 34 and erector 38 mounted within pivot tube 74. Pivotal movement of collector 34 and erector 38 results in a lateral shift of the image formed at second focal plane 72 to facilitate adjustment of aim for variations in bullet trajectory. Windage and holdover device O-rings 134 and 136 provide an air tight seal between housing 12 and windage and holdover control devices 60 and 62 so that a nitrogen gas charge can be maintained within sight 10 to prevent fogging and condensation on internal lens surfaces.

Figure 5:
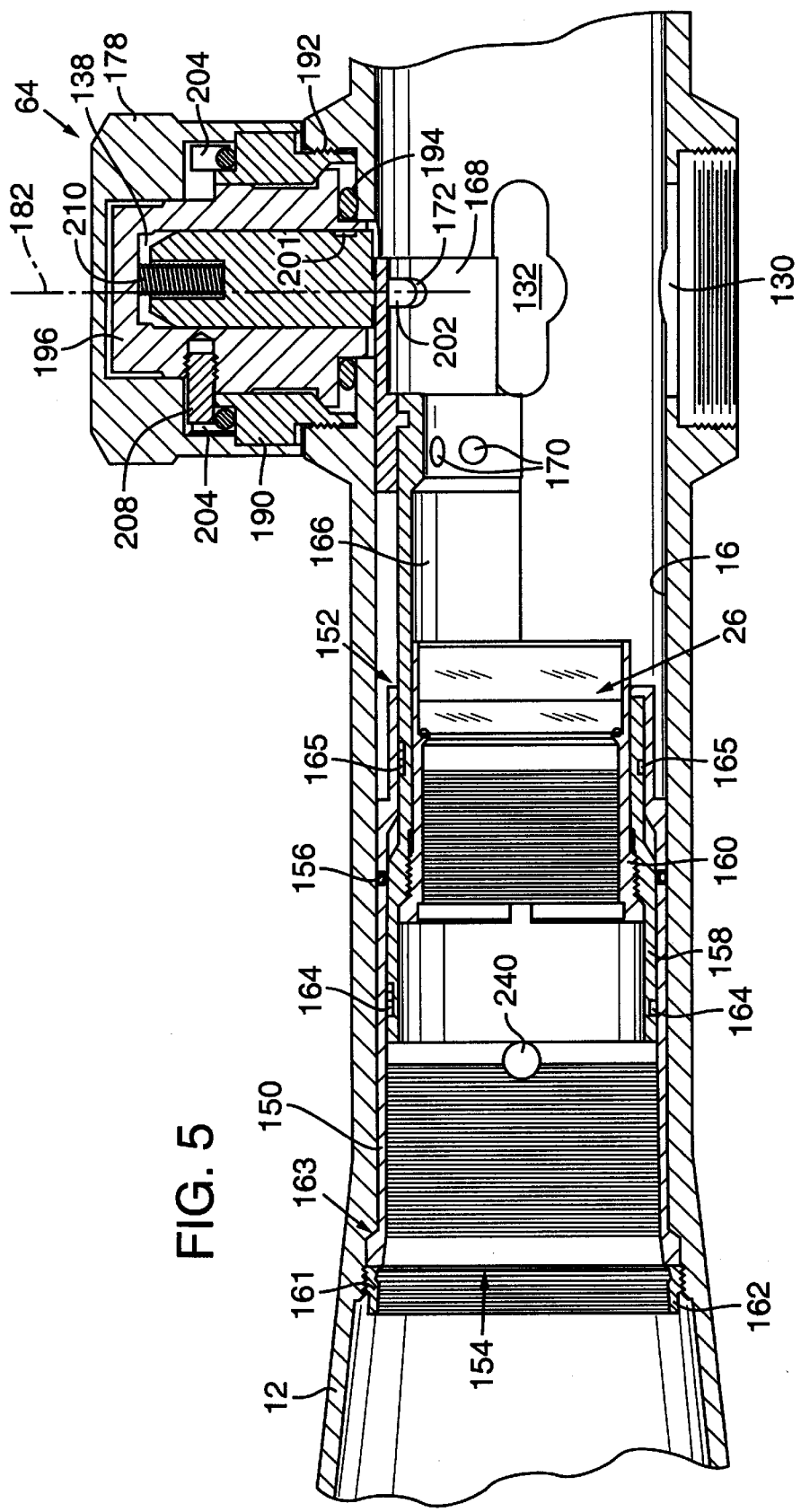
FIG. 5 is an enlarged partial sectional view of the telescopic sight taken along line 5—5 of FIG. 4 showing the movable objective portion and part of the linkage coupling the movable objective portion and the focus control device (windage and holdover control devices omitted)
Figure 6B:
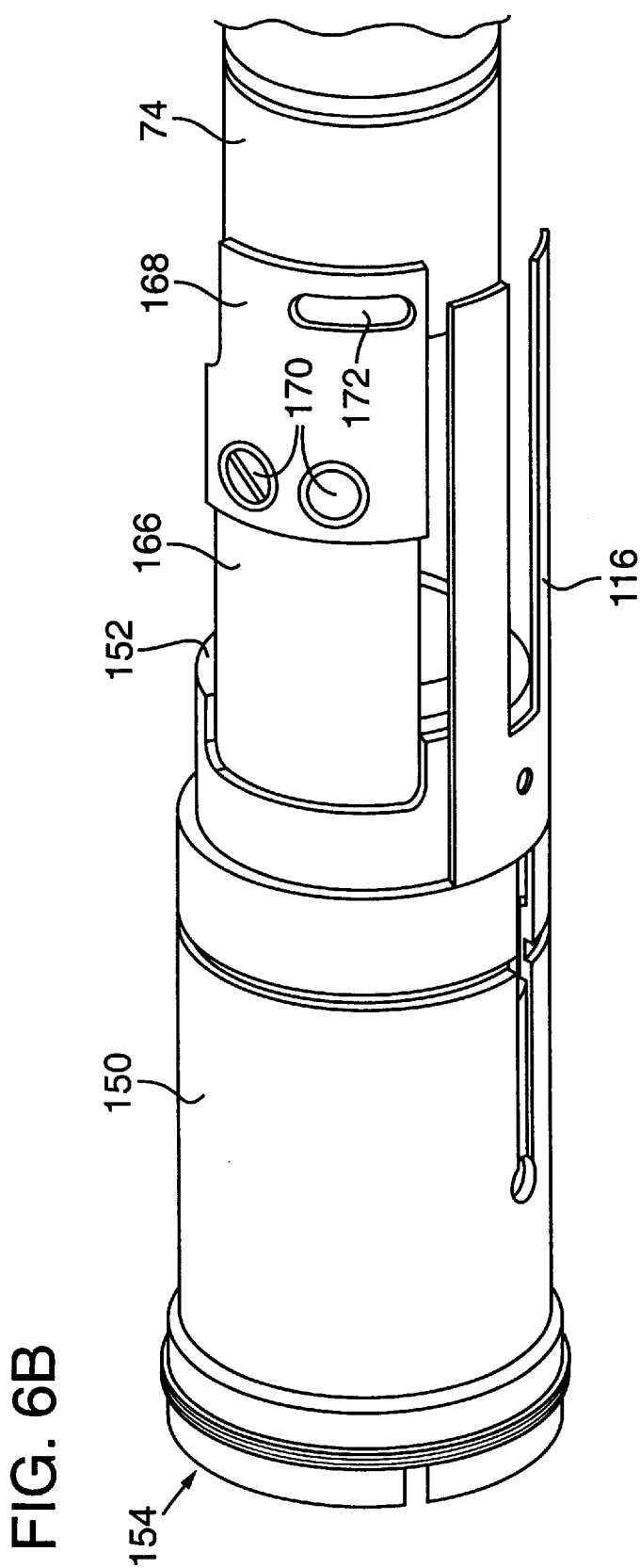
FIG. 6B is a second cut-away perspective view of the coupling of FIG. 6A from a different view point with the focus control device omitted.

One embodiment of the focus adjustment mechanism and linkage for controlling longitudinal movement of movable objective portion 26 is shown in FIGS. 3–5, 6A, and 6B. In this embodiment, movable objective portion 26 is positioned within the interior of housing 12 medially of fixed objective portion 24 and pivot tube 74. FIG. 4 shows enlarged cross sectional detail of focus control device 64. FIGS. 5, 6A, and 6B depict an embodiment of the linkage between movable objective portion 26 and focus control device 64. As shown in FIGS. 3, 5, 6A, and 6B, a spring sleeve 150 having a proximal end 152 and a distal end 154 is fixedly mounted within housing 12 medially of fixed objective portion 24 and pivot tube 74. A spring sleeve O-ring 156 formed of rubber or other elastomeric material fits around spring sleeve 150 to laterally center and cushion spring sleeve 150 within housing 12. Pivot tube leaf spring 116 is secured at one end to spring sleeve 150 near proximal end 152. A sliding carrier 158 is slidably mounted within spring sleeve 150 for longitudinal movement in response to a turning motion imparted to focus control device 64. Movable objective portion 26 is mounted within an objective holder 160, which is externally threaded for secure mounting and fine longitudinal adjustment within sliding carrier 158 during assembly. A spring sleeve lock nut 161 is externally threaded to mate with threads 162 on inner surface 16 of housing 12 for securing spring sleeve 150 against a circumferential step 163 formed in housing 12.

Two circumferential grooves 164 and 165 formed or machined about the outer diameters of sliding carrier 158 retain two sizers (not shown) formed of a material having a low coefficient of friction such as nylon-66 polyamide resin or TEFLON™ brand polytetraflouroethylene to reduce friction between sliding carrier 158 and spring sleeve 150 during focus adjustment. The two sizers provide a close fit between sliding carrier 158 and spring sleeve 150 without requiring tight dimensional tolerances and are preferably in the shape of C-rings that snap into circumferential grooves 164 and 165.

Sliding carrier 158 includes an extension 166, which may be integral with or securely attached to sliding carrier 158, extending beyond proximal end 152 of spring sleeve 150. A link arm 168 is attached to an end of extension 166 opposite sliding carrier 158 by one or more screws, rivets, or other suitable fasteners 170. A slot 172 in link arm 168 is oriented transverse to longitudinal axis 14. The mounting arrangement of sliding carrier 158 and link arm 168 allows clearance for pivotal movement of pivot tube 74 during windage and holdover adjustment and enables the central arrangement of pivot tube leaf spring 116 and the respective windage, holdover, and focus control devices 60, 62, and 64 as shown in FIG. 1. This central arrangement is aesthetically pleasing, allows easy operation by a marksman, and balances the forces exerted against pivot tube 74 by pivot tube leaf spring 116, and by holdover and windage control devices 60 and 62.

Focus control device 64 includes a focus knob 178 that is rotatable about a focus axis 182 and a focus device hub 190. Focus control device 64 is mounted to housing 12 by screw threads 192 on the exterior surface of focus device hub 190. A focus device O-ring 194 provides an air-tight seal between housing 12 and focus device hub 190 so that a nitrogen gas charge can be maintained within housing 12 to prevent fogging and condensation on internal lens surfaces.

Focus knob 178 is operatively connected to an eccentric cam 196, which is rotatably mounted within focus device hub 190 such that rotation of focus knob 178 imparts rotation to eccentric cam 196 about focus axis 182. An offset bore 198 in eccentric cam 196 holds a plunger 200 such that rotation of eccentric cam 196 results in orbital movement of plunger 200 about focus axis 182. A first sizer button (not shown) formed of DELRIN™ brand polyoxymethylene resin or other flexible, durable material is inserted in a first blind bore 201, approximately 0.070 inches in diameter and 0.015 inches deep, on the outer diameter of plunger 200. A second sizer button (not shown) is inserted in a second blind bore (not shown) similar in size to the first blind bore and positioned approximately 120-degrees from the first blind bore 201 about the circumference of plunger 200. The first sizer button and second sizer button reduce friction and ensure a close fit between plunger 200 and eccentric cam 196 to reduce backlash in the focus mechanism. Plunger 200 includes a key 202 for engagement with slot 172 in link arm 168 so that orbital movement of plunger 200 results in movement of movable objective portion 26 along longitudinal axis 14. Longitudinal movement of movable objective portion 26 allows the marksman to adjust the focus of telescopic sight 10 as described above. Focus control device 64 includes two stops 204 and a stop pin 208 to limit rotation of eccentric cam 196 to approximately 180 degrees so that plunger 200 follows a 180-degree arc. Markings (not shown) on the exterior of focus knob 178 or housing 12, or both, indicate the rotational position of focus control device 64 and allow the marksman to use one eye to view the target through sight 10 and the other eye to view the markings. In this way the marksman is able to determine the amount of focus adjustment made without moving from the shooting position.

Key 202 is elongated so that its engagement in slot 172 constrains rotational movement of plunger 200. Key 202 is offset longitudinally from the centerline of plunger 200 to allow clearance for pivotal movement of pivot tube 74. The longitudinal offset of key 202 in plunger 200 shifts the path of orbital movement of key 202 along longitudinal axis 14 relative to the position of focus axis 182 without reducing the amount of longitudinal travel of key 202. In addition to the longitudinal offset, key 202 is offset vertically from the centerline of plunger 200 for clearance of pivot tube leaf spring 116. A plunger spring 210 within offset bore 198 urges plunger 200 toward the interior of housing 12 to ensure proper engagement of key 202 in slot 172.

Figure 7:
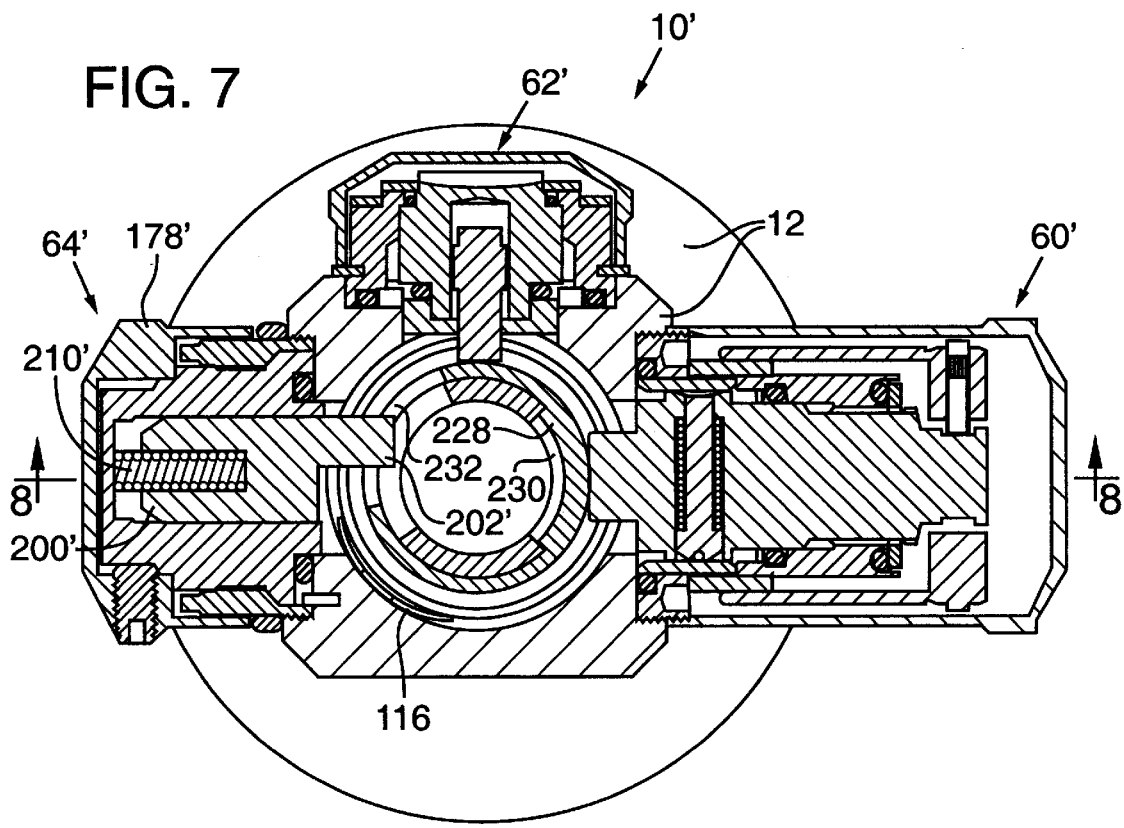
FIG. 7 is a sectional view of an alternate embodiment of the telescopic sight taken along line 4—4 of FIG. 3.
Figure 8:
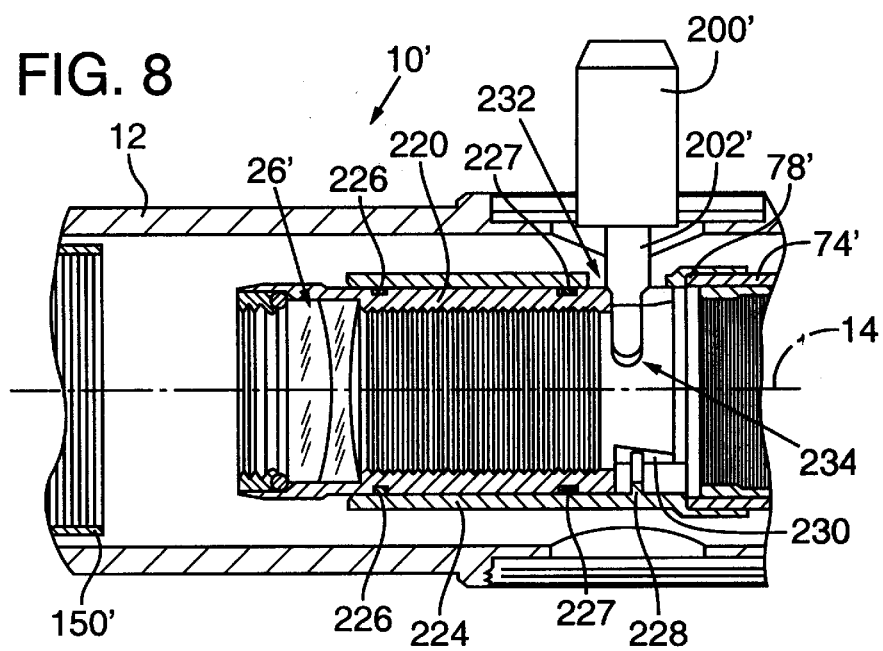
FIG. 8 is a partial sectional view of the telescopic sight taken along line 8—8 of FIG. 7 showing an alternate embodiment of the movable objective portion wherein the movable objective portion is a Barlow lens mounted within the pivot tube (windage and holdover control devices omitted).

FIGS. 7 and 8 show cross sectional detail of the focus control mechanism of a second embodiment telescopic sight 10' of the present invention. (In FIGS. 7 and 8 reference numerals with the prime symbol, e.g., 26', indicate elements similar to those of the same name in the first embodiment, i.e., movable objective portion 26.) FIG. 7 is similar to FIG. 4 and is a cross section of telescopic sight 10' showing the respective windage, holdover, and focus control devices 60', 62', and 64' in detail. FIG. 8 is a cross section of telescopic sight 10' taken along line 8—8 of FIG. 7 showing the linkage between focus control device 64' and movable objective portion 26' of telescopic sight 10'.

With particular reference to FIG. 8, movable objective portion 26' is connected to pivot tube 74' near distal end 78' to enable pivotal movement of movable objective portion 26' in conjunction with holdover and windage adjustments. Movable objective portion 26' includes a Barlow lens (a plano-concave negative lens) to increase the effective range of windage and holdover adjustment by an amount proportional to the power of the Barlow lens. Including a Barlow lens in movable objective portion 26' also results in an increase in the overall effective focal length of telescopic sight 10' without a change in the physical dimensions of housing 12. In this way, telescopic sights having different focal lengths can be economically manufactured by installing the appropriate lens configuration within a housing of a single uniform design. Further, because the outer dimensions of housing 12 are standard, sights of different focal lengths can be mounted to a rifle using the same mounting hardware (not shown).

With reference to FIGS. 7 and 8, movable objective portion 26' is fixedly mounted within a carrier tube 220. Carrier tube 220 is fitted within and movable longitudinally within an extension tube 224. Similar to the first embodiment, two circumferential grooves 226 and 227 are formed or machined about the outer diameter of carrier tube 220 to retain two sizers (not shown) for close fit and reduced friction between carrier tube 220 and extension tube 224. Extension tube 224 is securely connected to distal end 78' of pivot tube 74' and has a smaller outer diameter than pivot tube 74' to allow a maximum amount of pivotal travel within housing 12 of the assembled pivot tube 74' and extension tube 224. The method of windage and holdover adjustment is substantially identical to the mechanism of the first embodiment (FIGS. 3–5) so that lenses operatively connected to pivot tube 74' are pivoted to divert the optical path for shifting laterally the image at second focal plane (not shown) relative to reticle (not shown). Optional low-profile and large target style windage and holdover control devices 60' and 62' are shown in FIG. 7 in place of standard style control devices of FIG. 4.

Extension tube 224 includes a guide rail 228 engaged in longitudinally oriented carrier tube guide slot 230 for constraining rotational movement of carrier tube 220 during focus adjustment. Similar to the first embodiment (FIGS. 4, 5, 6A, and 6B), focus adjustment in the second embodiment includes a pin-in-slot cam connection to a rotatable focus control device 64' for longitudinal movement of carrier tube 220 and movable objective portion 26'. As in the first embodiment, pivotal displacement of pivot tube 74' results in generally longitudinal movement of movable objective portion 26' during focus adjustment with a small component of lateral movement.

Focus control device 64' is similar to focus control device 64 of the first embodiment and includes a focus knob 178' and a plunger 200' having a key 202'. Unlike key 202 of the first embodiment, key 202' of the second embodiment is not offset longitudinally in plunger 200' because a longitudinally shifted orbital path is not necessary for clearance of pivot tube 74' in the second embodiment. However, key 202' is offset vertically from the centerline of plunger 200' for clearance of pivot tube leaf spring 116. Rotation of focus knob 178' moves key 202' orbitally within a window 232 in extension tube 224. A carrier slot 234 is formed in carrier tube 220 and oriented transverse of the longitudinal axis 14 of housing 12. Key 202' is elongated and snugly engaged in carrier slot 234 so that rotational movement of plunger 200' is constrained. Plunger spring 210' urges plunger 200' toward pivot tube 74' to ensure proper engagement of key 202' in carrier slot 234 throughout the range of windage and holdover adjustment.

Assembly

The nature and complexity of the arrangement of the various components of telescopic sight 10 specifies a particular order of assembly of certain components of telescopic sight 10. With reference to FIGS. 3–5, a first subassembly including spring sleeve 150, pivot tube leaf spring 116, spring sleeve O-ring 156, sliding carrier 158, sizers (not shown), link arm 168, and fasteners 170 is initially installed in housing 12 and secured in place by spring sleeve lock nut 161. Windage, holdover, and focus control devices 60, 62, and 64 are then installed, with key 202 on plunger 200 in engagement with slot 172 in link arm 168. A tool (not shown) is inserted from the objective end of housing 12 and expanded to depress pivot tube leaf spring 116 toward inner surface 16 of housing 12. Next, a second subassembly including pivot tube 74, collector 34, erector 38, and their mounting hardware is installed in the eyepiece end of housing 12 and the tool is removed. Objective holder 160 and movable objective portion 26 are then mounted within sliding carrier 158 and adjusted longitudinally within sliding carrier 158 to a predetermined position. Fixed objective portion 24 is installed, followed by reticle 44 and eyepiece 30. Longitudinal adjustment during assembly of objective holder 160 and movable objective portion 26, in combination with longitudinal adjustment of fixed objective portion 24 during assembly, establishes the working range of the marksman's parallax adjustment for viewing objects from a distance of 50 yards or more from sight 10.

After the entire optical system 20 has been installed in sight 10, air is removed from the interior of housing 12 through a vent hole 240 (FIG. 5) and replaced with nitrogen gas to prevent fogging and condensation on internal lens surfaces. Vent hole 240 is then sealed to maintain the nitrogen gas charge within sight 10.

Assembly of the second embodiment telescopic sight 10' of FIGS. 7 and 8 takes place in substantially the same order of assembly as the first embodiment telescopic sight 10, with the following exceptions. With reference to FIG. 8, a spring sleeve 150' is installed to hold pivot tube leaf spring 116 (FIG. 7). A sliding carrier is not installed in spring sleeve 150'. As in the first embodiment, a tool (not shown) is then expanded within sight 10' to depress pivot tube leaf spring 116 so that the pivot tube subassembly can be installed from the eyepiece end of housing 12. Movable objective portion 26', extension tube 224, and carrier tube 220 are attached to pivot tube 74' (in addition to the erector, collector, and their mounting hardware) before installation of the pivot tube subassembly in housing 12.

It will be obvious to those having skill in the art that many changes may be made to the details of the above-described embodiments of this invention without departing from the underlying principles thereof. The scope of the present invention should, therefore, be determined only by the following claims.

We claim:

1. A telescopic sight with variable optical power and an adjustable focus, the telescopic sight including a tubular housing having a longitudinal axis, an interior and exterior, and first and second ends, the housing holding an eyepiece positioned at the second end and an erector positioned in the interior of the housing medially of the first end and the eyepiece, comprising:

a movable mounting member for mounting the erector;

a manually adjustable magnification control device having a range of adjustment and operatively connected to the mounting member to move the erector generally along the longitudinal axis and thereby vary the optical power of the telescopic sight;

a pivot mount positioned within the interior of and operatively connected to the housing for pivotal movement within the housing about a pivot point, the pivot mount operatively connected to the erector for pivotal movement of the erector about the pivot point;

a manually adjustable windage control device projecting outwardly from the exterior of the housing in a direction transverse to the longitudinal axis and positioned opposite a manually adjustable focus control device, the windage control device in operative association with the pivot mount for movement of the erector transversely of the longitudinal axis;

a manually adjustable holdover control device projecting outwardly from the exterior of the housing in a direction transverse to the longitudinal axis and transverse to the windage control device, the holdover control device in operative association with the pivot mount for movement of the erector transversely of the longitudinal axis and transversely of the movement imparted to the erector by the windage control device;

an objective lens system including a stationary portion positioned in the interior of the housing near the first end and a movable portion positioned in the interior of the housing between the stationary portion and the erector, the movable portion operatively connected to the pivot mount so that adjustment of the windage and holdover control devices imparts pivotal movement to the movable portion transversely of the longitudinal axis; and the manually adjustable focus control device projecting outwardly from the exterior of the housing in a direction transverse to the longitudinal axis, the focus control device operatively connected to the movable portion of the objective lens system to move the movable portion generally along the longitudinal axis and thereby adjust the focus of the telescopic sight.

2. The telescopic sight of claim 1, further comprising a slidable lens carrier and a coupling mechanism located within the interior of the housing, the lens carrier holding the movable portion of the objective lens system and the coupling mechanism coupling the focus control device to the lens carrier to cause it to move generally along the longitudinal axis in response to an adjustment of the focus control device.

3. The telescopic sight of claim 2 wherein the focus control device is rotatable about a focus control axis and includes a key for orbital movement within the housing about the focus control axis, and wherein the coupling mechanism includes a slot oriented transversely of the longitudinal axis for receiving the key such that orbital movement of the key imparts movement to the lens carrier generally along the longitudinal axis.

4. The telescopic sight of claim 1 wherein the movable portion includes a positive lens.

5. The telescopic sight of claim 1 wherein the movable portion includes a Barlow lens.

6. The telescopic sight of claim 1 wherein the objective lens system projects an image at a first focal plane located medially of the movable portion and the erector, the telescopic sight further comprising:
- a reticle positioned within the interior of the housing medially of the eyepiece and the erector; and
- a collector positioned within the interior of the housing and between the first focal plane and the erector, the first focal plane, collector, and erector defining a second focal plane located medially of the eyepiece and the erector, the collector responsive to the magnification control device for movement generally along the longitudinal axis to maintain the focus at the second focal plane of the image of the first focal plane during movement of the erector.

7. The telescopic sight of claim 6 wherein the collector and erector are responsive to the magnification control device such that the collector and the erector move at independent rates.

8. A telescopic sight for viewing distant objects, the telescopic sight having a variable optical power setting, an adjustable focus setting, an adjustable windage offset, and an adjustable holdover offset, the telescopic sight including a tubular housing having a longitudinal axis, an interior and exterior, and first and second ends, the housing holding an eyepiece at the second end, a pivot mount pivotally mounted within the interior of the housing and positioned medially of the first end and the eyepiece, an erector operatively connected to the pivot mount for pivotal movement therewith, the erector movable generally along the longitudinal axis to vary the optical power setting of the telescopic sight, a reticle positioned medially of the erector and the eyepiece, the erector forming an image near the reticle of a distant object being viewed, and a pair of adjustable aiming control devices in operative association with the pivot mount for pivotally moving the erector within the housing and thereby shifting laterally the image formed by the erector in relation to the reticle to adjust the windage and holdover offsets, the telescopic sight comprising:

- an objective lens system including a stationary portion positioned in the interior of the housing near the first end and a movable negative lens portion positioned in the interior of the housing between the stationary portion and the erector, the movable negative lens portion operatively connected to the pivot mount so that adjustment of the aiming control devices imparts pivotal movement to the movable negative lens portion, thereby laterally shifting the image formed by the erector and increasing the windage and holdover offsets; and
- a manually adjustable focus control device operatively connected to the movable negative lens portion of the objective lens system to move the movable negative lens portion generally along the longitudinal axis and thereby adjust the focus setting of the telescopic sight.

9. The telescopic sight of claim 8 wherein the movable negative lens portion includes a Barlow lens.

10. The telescopic sight of claim 8 wherein the focus control device projects outwardly from the exterior of the housing in a direction transverse to the longitudinal axis.

11. The telescopic sight of claim 8, further comprising a slidable lens carrier and a coupling mechanism located within the interior of the housing, the lens carrier operatively connected to the pivot mount for holding the movable negative lens portion of the objective lens system and the coupling mechanism coupling the focus control device to the lens carrier to cause the lens carrier to move generally along the longitudinal axis in response to an adjustment of the focus control device.

12. The telescopic sight of claim 11 wherein the focus control device is rotatable about a focus control axis and includes a key for orbital movement within the housing about the focus control axis, and wherein the coupling mechanism includes a slot oriented transversely of the longitudinal axis for receiving the key such that orbital movement of the key imparts movement to the lens carrier generally along the longitudinal axis.

\* \* \* \* \*